May 28, 1935.    N. SINGER    2,002,719
OPHTHALMIC LENS
Filed July 18, 1933

INVENTOR.
Nathaniel Singer.
BY
ATTORNEYS

Patented May 28, 1935

2,002,719

UNITED STATES PATENT OFFICE 2,002,719

OPHTHALMIC LENS

Nathaniel Singer, New York, N. Y., assignor to Optical Research Corporation, New York, N. Y., a corporation of New York Application July 18, 1933, Serial No. 681,000

4 Claims. (Cl. 88—54)

My invention relates to ophthalmic lenses. It has to do primarily with single vision lenses, though it is capable of application to multifocal lenses as well.

In the prior art, numerous efforts have been made to produce special purpose lenses effective to protect the eyes from abnormally bright rays of light. Among these lenses are those types which possess special colored areas of a relatively opaque nature located to protect the eyes from overhead lights, from lights at the side such as from an approaching automobile or the like. Some effort has been made to provide lenses wherein the visual field is completely surrounded by a relatively opaque area but these efforts have been of such a nature as to unduly restrict the actual vision area of clear glass.

One of the objects of this invention is to provide ophthalmic lenses having an amply large visual area centrally disposed and, at the same time, to provide a means for protecting the eyes from such light rays as strike the outer edges of the lens, eliminating glare and removing the glitter that makes for eye discomfort.

Another object of this invention is to provide such a lens as will afford ample protection of the eyes from light rays which may strike upon or adjacent to the edges of the lens while, at the same time, affording an actual visual area which is adequately extensive in all directions.

Another object of this invention is to provide an ophthalmic lens of the character indicated which may be produced by a simple method that will permit of the production of the lens at a much lower cost, while at the same time maintaining the quality of the lens on a parity with present day quality.

In its preferred embodiment, the ophthalmic lens which I have devised comprises a visual area of clear uncolored glass which is of a size corresponding approximately to the area of the lens commonly prescribed in present day practice. This visual area is surrounded by a relatively small area of glass of selected color which is integral therewith but which is of a nature to absorb the light rays sufficiently to adequately protect the eyes from the glare resulting from the striking of these light rays upon or adjacent to the edges of the lens.

The method which I preferably use for producing this lens contemplates the protection of that portion of the lens which is to become the visual area of the lens followed by the treatment of the surrounding area of glass in such a manner as to alter the color characteristics of the glass in this surrounding area so as to give it higher light absorptive qualities.

Several types of ophthalmic lenses which may be produced in accordance with my invention are shown in the accompanying drawing wherein similar characters of reference designate corresponding parts and wherein.

Figure 1:
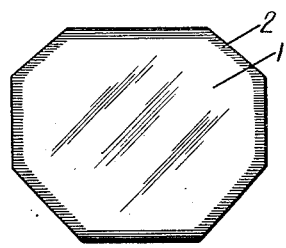
Figure 1 is a plan view of one type of lens made in accordance with my invention.
Figure 2:
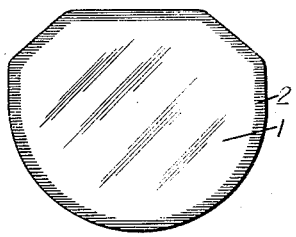
Figure 2 is a plan view of a lens of a somewhat different perimetric shape but having a substantially similar visual area.
Figure 3:
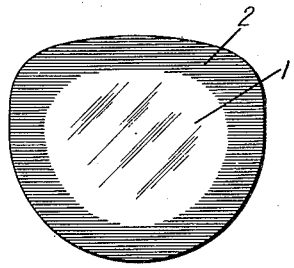
Figure 3 is a plan view of a lens having a still different perimetric shape with a drop-oval visual field.
Figure 4:
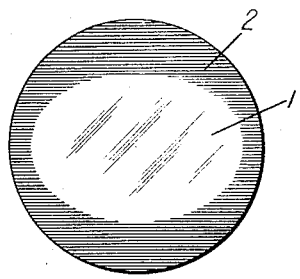
Figure 4 is a plan view of a lens of a circular form with a still different form of visual area.

In the drawing, referring particularly to Figures 1 to 4, inclusive, the lens is shown as having a central area of white glass as at 1. This area of white glass constitutes the visual area of the lens and it will be noted that it is amply large to provide a full visual field. As indicated, it may vary as to form to any desired extent.

It will be seen that this visual field is surrounded by a shaded area 2 which may be tinted or colored or which may otherwise have imparted thereto higher light absorptive properties.

Figure 5:
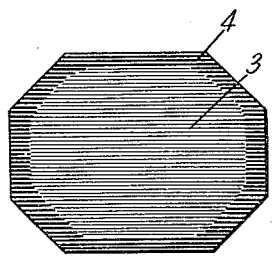
Figure 5 is a plan view of a lens wherein the visual area is of one tint while the surrounding area is of a still different tint.
Figure 6:
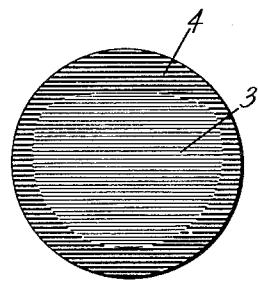
Figure 6 is a plan view of a circular lens wherein the visual field is of one tint while the surrounding area is of a still different tint, the visual area being of somewhat different form from that shown in Figure 5.
Figure 7:
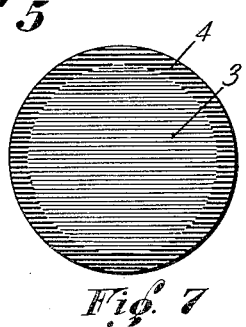
Figure 7 is a plan view of a circular lens wherein the visual field is shown as being of one tint while the surrounding area is of a still different tint, the visual area being of somewhat different form from those shown in Figures 5 and 6.

In the forms shown in Figures 5, 6 and 7, the visual area is indicated at 3 and, as indicated by the shading, it may be slightly tinted. In these forms, also, it will be noted that the central area is amply large to provide a full area of vision.

In those forms shown in Figures 5, 6 and 7, the surrounding area is also tinted or colored as indicated at 4 or it is otherwise given higher light absorption characteristics.

It will be understood that lenses made in accordance with my invention may have a visual area which is entirely white while the outer area may be of a light or mild tint or of a medium or darker shade if desired. On the other hand, the central zone may be a light or other tint with the outer area a medium or darker tint. As a matter of fact, the central zone may be a light or darker tint and the outer area a white or lighter tint with the glass thereof of such a nature that it will have higher light absorption properties than the glass in the central zone.

The dividing wall between the two zones of my lens may be at right angles to the surfaces of the lens and preferably provides a sharp line of demarcation between the zones. However, one zone may shade into the other and, if desired, the dividing wall may be at less or more than a right angle to produce a bevel surface so that the change from one area to the other will be gradual or blended.

It will also be understood that, if the lens is made by fusing a plurality of pieces of glass together, the glass of the central zone may have a similar index of refraction to the glass of the surrounding zone and both may have similar dispersive properties, the light absorptive properties being accentuated by the different color characteristics. On the other hand, though the glasses used in the two different zones preferably have similar indices of refraction, they may have different dispersive properties so that the glass in the outer zone possesses higher light absorption characteristics.

It will also be understood that my invention is applicable to lenses of various types. For example, it is applicable to flat lenses, spherical lenses or toric lenses of any form.

One method of making my lens contemplates the use of a one-piece blank for the production of a one-piece lens. In this type of lens, the visual area of the lens will preferably be protected with a lead pad or plate while the surrounding area is subjected to light rays which are so related to the glass of the blank and so applied thereto as to increase the light absorption characteristics of the outer area of the lens. The X-ray may be used for producing this result or other suitable light rays applied for an adequate period of time may be utilized. It will be understood that the type of glass used and thus subjected to light rays should be selected to produce the tint or color desired or, at least, to produce the light absorption characteristics desired.

It is also within contemplation of my invention to change the light absorption characteristics of the outer zone of my lens by the application of an electrical current to the lens or to the blank. The type of current utilized will depend upon the quality of glass in the lens and upon the color or light absorption characteristics desired to be obtained. Suitable means may be provided for protecting the visual area to ensure that the light absorption characteristics imparted to the outer area will not be imparted to the visual area to an undesirable extent.

It will be apparent that, with my lens, marginal reflection, which is bound to be detrimental to distinct vision with regard to contrasts between light and shade, is practically eliminated. It is a well-known fact that strong light rays reaching the lens at its edge, enter through the edge of the lens and travel by internal reflection throughout the lens. These rays traveling through the lens interfere considerably with vision through the lens and are detrimental to visual acuity. However, with my lens, due to the fact that a border of high light-absorptive characteristics is provided, the strong light rays striking the margin of the lens will be absorbed for the most part by the said border. Thus, distinct vision regarding contrast between light and shade will be ensured.

It will be seen from this that I have provided a novel type of lens which will protect the eye from the light rays striking upon and adjacent to the edge of the lens by reducing the intensity of the light rays passing to the retina of the eye from these areas of the lens. At the same time, the normal visual area of the lens is unrestricted.

Obviously, the light absorption properties of the outer area of the lens may be increased or reduced in the making of the lens to properly fit it for the conditions under which it is to be used, this being also true as to the inner visual area of the lens. Various other modifications will be apparent from the above description and from the appended claims.

Having thus described my invention, what I claim is:

1. An ophthalmic lens composed of a single piece of optical glass, said lens having a central portion composed of glass which is transparent and of sufficient area so that direct vision normally occurs therethrough, said central portion being completely surrounded by a border of glass which is transparent and through which vision may occur but which has inherently in the glass thereof higher light-absorptive properties than the glass of the said central portion, the border of glass of higher light-absorptive properties extending through the full thickness of the lens in order to completely protect the said central portion from strong rays of light striking the lens upon or adjacent the edge thereof.

2. An ophthalmic lens composed of a single piece of optical glass, said lens having a central portion composed of glass which is transparent and through which vision normally occurs, said central portion being completely surrounded by a border of glass which is transparent and through which vision may occur but which has inherently in the glass thereof higher light-absorptive properties than the glass of the said central portion, the border of glass of higher light-absorptive properties extending through the full thickness of the lens in order to completely protect the said central portion from strong rays of light striking the lens upon or adjacent the edge thereof, the widest part of said border of glass of higher light-absorptive properties being much less in width than the part of said central portion having the least width.

3. An ophthalmic lens composed of a single piece of optical glass, said lens having a central portion composed of glass which is transparent and through which vision normally occurs, said central portion being completely surrounded by a border of glass which is transparent and through which vision may occur but which has inherently in the glass thereof higher light-absorptive properties than the glass of the said central portion, the border of glass of higher light-absorptive properties extending through the full thickness of the lens in order to completely protect the said central portion from strong rays of light striking the lens upon or adjacent the edge thereof, a portion of the outer boundary of said central portion lying along a straight line.

4. An ophthalmic lens composed of a single piece of optical glass, said lens having an inner portion composed of glass which is transparent and of sufficient area so that direct vision normally occurs therethrough, said inner portion being bordered by a portion of glass which is transparent and through which vision may occur but which has inherently in the glass thereof higher light absorptive properties than the glass of the said inner portion, the border of glass of higher light absorptive properties extending through the full thickness of the lens in order to completely protect the said inner portion from strong rays of light striking upon or adjacent the edge thereof.

NATHANIEL SINGER.